United States Patent Office 3,698,954
Patented Oct. 17, 1972

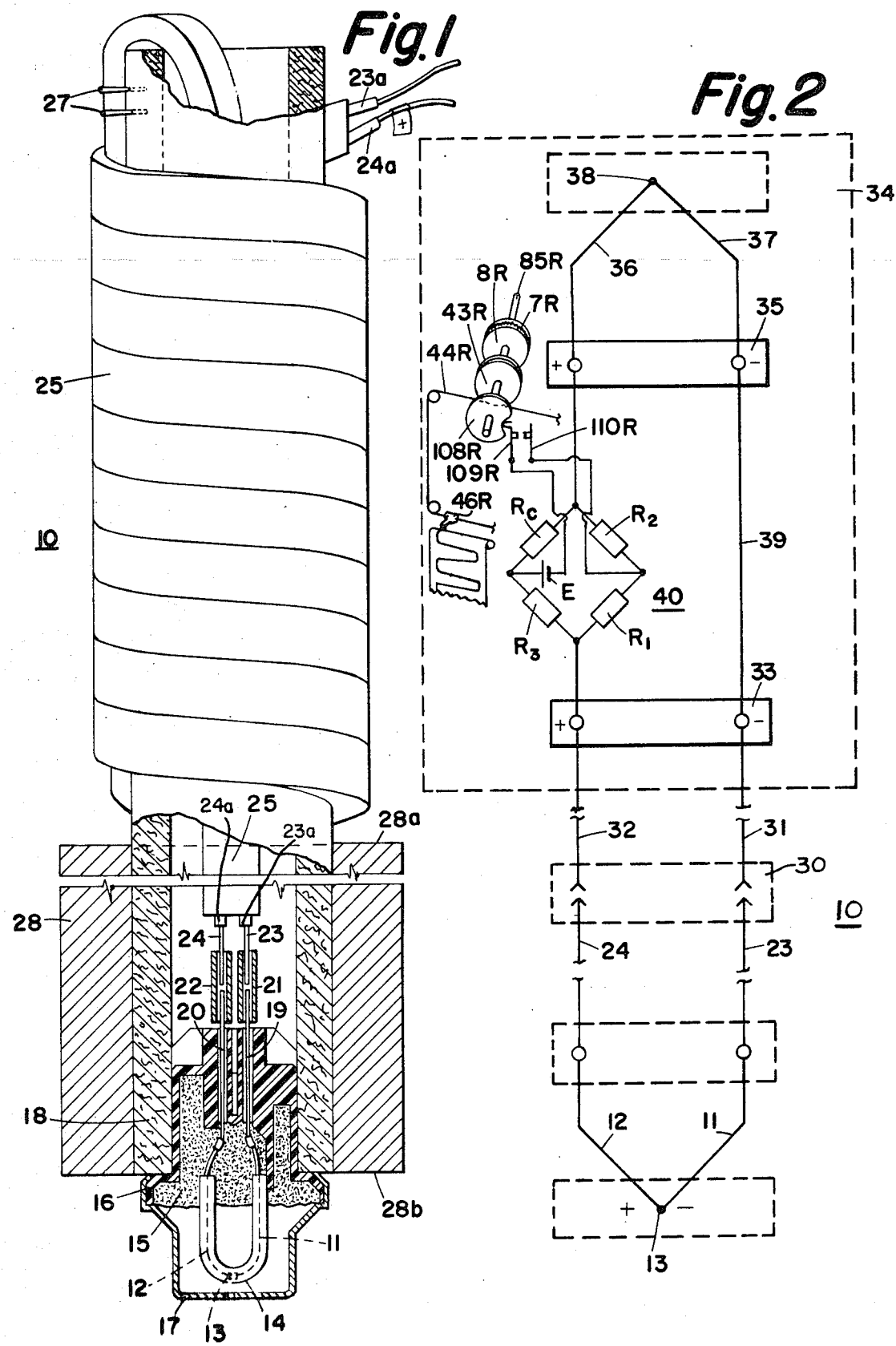
Oct. 17, 1972  L. R. JONES, JR  3,698,954
EXPENDABLE IMMERSION THERMOCOUPLE ASSEMBLY
Original Filed April 6, 1965  3 Sheets-Sheet 1

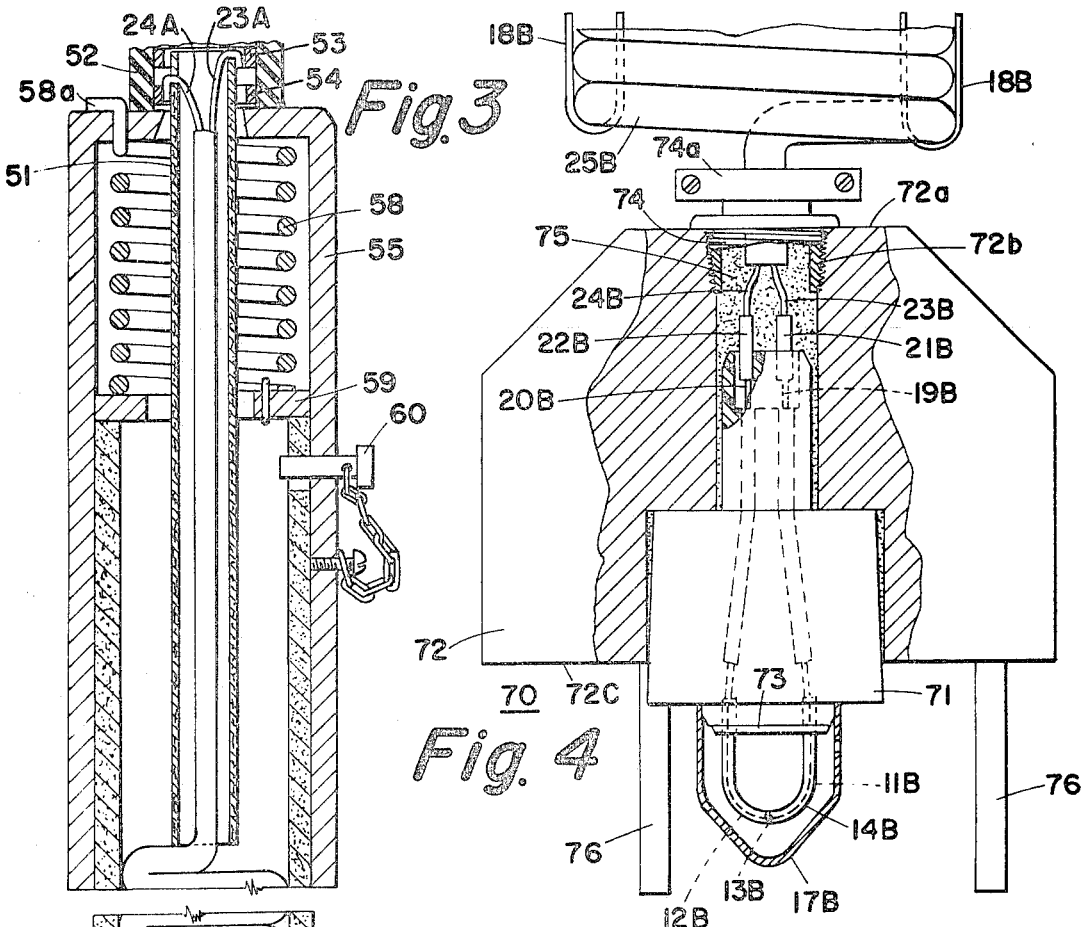
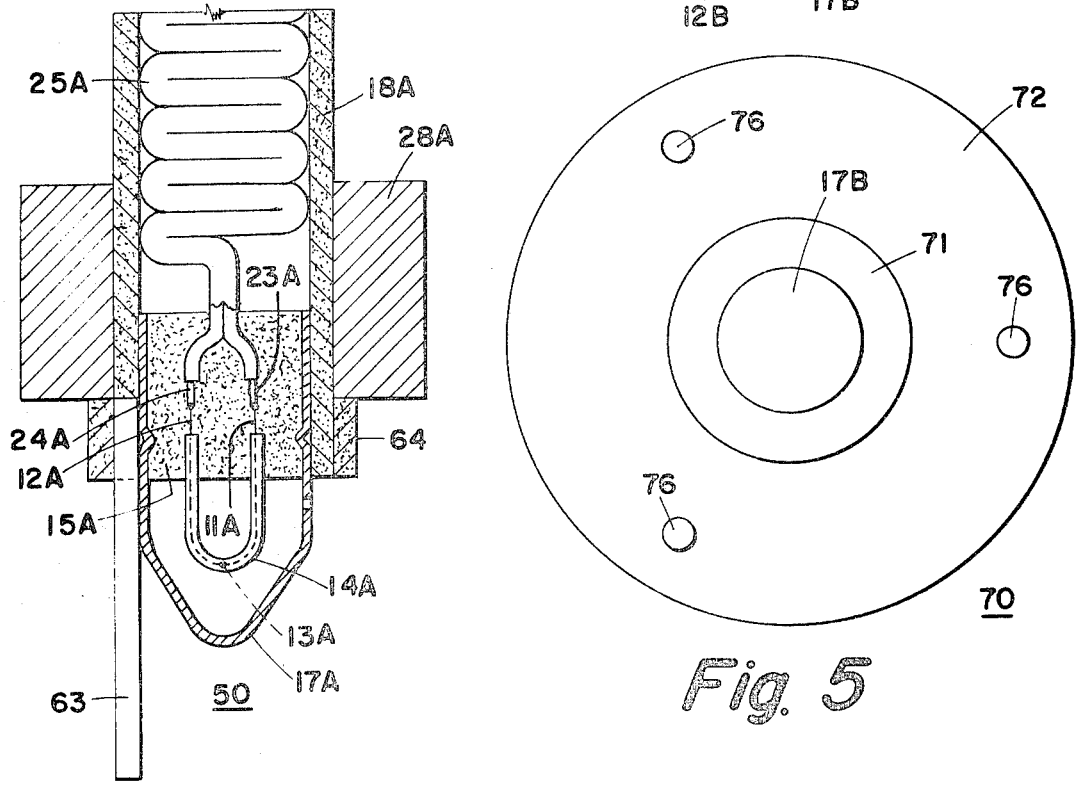

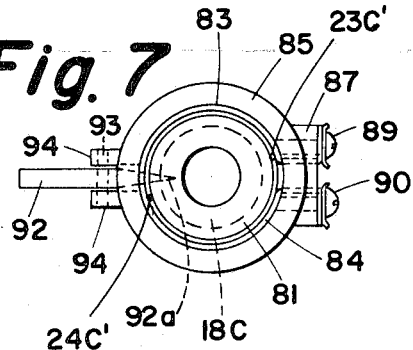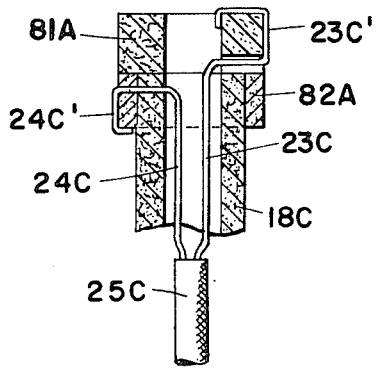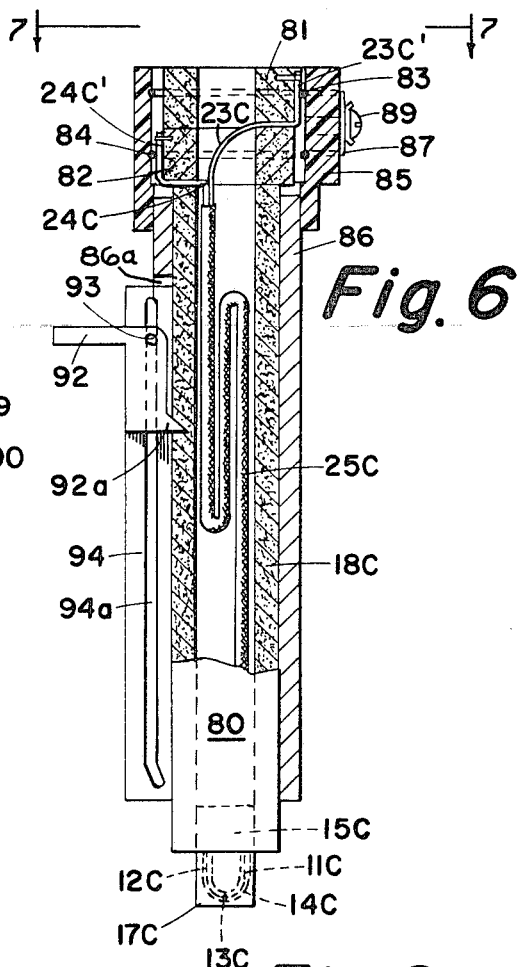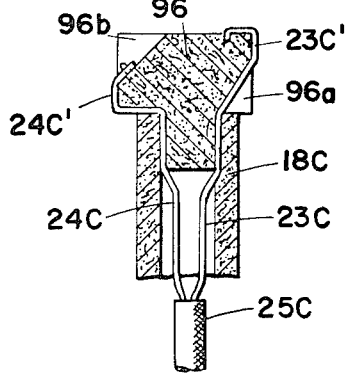

3,698,954
EXPENDABLE IMMERSION THERMOCOUPLE ASSEMBLY
Louis R. Jones, Jr., Abington, Pa., assignor to Leeds & Northrup Company, Philadelphia, Pa.
Continuation of application Ser. No. 446,000, Apr. 6, 1965. This application Dec. 9, 1968, Ser. No. 796,258
Int. Cl. H01v 1/02
U.S. Cl. 136—234                    12 Claims

ABSTRACT OF THE DISCLOSURE

An expendable immersion thermocouple assembly for measuring the temperature of a molten bath in a furnace including body structure mounted in one end of a cardboard tube. A coil of heat-insulated leadwires is electrically connected at one end to the thermocouple device. The coil is supported within the cardboard tube with the turns of the coil being in engagement with the inner wall of the cardboard tube, the leadwires having an uncoiled length several feet greater than the length of the cardboard tube for extension therebeyond an adequate distance to permit the thermocouple device to penetrate to a subsurface level of the molten bath while the opposite end of the leadwires is adapted for connection to a measuring circuit.

---

This application is a continuation of parent application Ser. No. 446,000 filed Apr. 6, 1965, now abandoned.

The present invention relates to an expendable immersion temperature-sensing assembly and has for an object an expendable immersion thermocouple assembly particularly suited for measuring the temperature of a molten bath of steel in a basic oxygen furnace.

The basic oxygen furnace is a relatively new furnace for steel production that was developed in Europe and has recently gained considerable acceptance in this country. Due to its tremendous efficiency, steel can be produced at a much faster rate than in furnaces of the open hearth type. However, basic oxygen furnaces present a very difficult problem for temperature measurement of the bath in that it is necessary to stop the oxygen blast and tilt or position the furnace so that an operator can immerse an expendable type thermocouple for obtaining a temperature measurement. Expendable immersion thermocouples were first introduced commercially for the measurement of bath temperatures in open hearth and electric furnaces in 1958. Examples of such expendable immersion thermocouples are disclosed and claimed in Mead Pats. 2,999,121 and 3,038,951, Moore Pat. 3,024,295, Parker Pat. 3,048,642 and Robertson et al. Pat. 3,055,961. In view of the fact that the total time for steel production in a bath in a basic oxygen furnace runs from 30 to 45 minutes, this means that a delay of three or four minutes to obtain a temperature reading becomes a very important percentage of the overall production time, and hence, becomes a relatively expensive reading. Accordingly, it is an object of the present invention to provide a method and means for obtaining a quick temperature measurement in a basic oxygen furnace, without the necessity of withdrawing the oxygen lance and tilting or repositioning the furnace.

In accordance with the present invention there is provided an expendable immersion temperature-sensing assembly for measuring the temperature of a molten bath in a furnace such as a basic oxygen furnace. Such assembly includes body structure including material having both heat insulating and electrical insulating characteristics and a refractory protected heat responsive device such as a thermocouple or equivalent mounted in the material and projecting from one end of the body structure. A fusible protective cap encloses the refractory protected heat responsive device and the body structure in a preferred form is mounted in one end of a cardboard tube. A coil of heat insulated leadwires is electrically connected at one end to the heat responsive device. The leadwires have a length several feet greater than the length of the cardboard tube for extension therebeyond an adequate distance to permit the heat responsive device to penetrate to a subsurface level of the molten bath while the opposite end of the leadwires is adapted for connection to a measuring system outside of the furnace. The leadwires are adapted to be uncoiled upon insertion of the heat responsive device into the molten bath and the heat insulation on the leadwires is adequate to protect the leadwires upon direct contact with the molten bath for a period of time adequate to complete a temperature measurement of the bath. There is further provided means for moving the heat responsive device to a position below the surface of the molten bath. Such means may take the form of a "pushing means" or a "shoot-in means" particularly for use with devices designed for open hearth furnaces. However, in the preferred form of the invention for use in basic oxygen furnaces, such means includes weight structure having a mass of material of density greater than that of the material of the molten bath so that the temperature sensitive element of the heat responsive device will be maintained in the molten metal bath. The weight structure should be mounted on the cardboard tube adjacent the heat responsive device.

It is a further object of the invention to provide a compensating circuit for connection between the expendable thermocouple assembly and the measuring system outside of the furnace.

For further objects and advantages of the present invention, and for a more detailed description thereof, reference is to be had to the following description taken in conjunction with the accompanying drawings, in which:

FIG. 1 is an elevational view, partly in section, of an expendable thermocouple assembly embodying the present invention;

FIG. 2 is a schematic diagram illustrating the electrical circuit of an expendable thermocouple assembly embodying the present invention as associated with a recorder;

FIG. 3 is an elevational view, in section, of a modified form of expendable thermocouple assembly embodying the present invention;

FIG. 4 is an elevational view, partly in section, of another modification of an expendable thermocouple assembly embodying the present invention;

FIG. 5 is a bottom end view of FIG. 4;

FIG. 6 is an elevational view, partly in section, of a further modification of an expendable thermocouple assembly embodying the present invention;

FIG. 7 is an end view of FIG. 6 looking in the direction of arrows 6—6; and

FIGS. 8 and 9 are modifications of the contact structures in FIG. 6.

Referring to FIG. 1, there has been illustrated an expendable thermocouple assembly 10 embodying the present invention and particularly suited for measuring the temperature of a molten bath in a basic oxygen furnace. The assembly 10 includes a pair of dissimilar thermocouple elements 11 and 12 connected together at one of their ends to form a hot or measuring junction 13 for the thermocouple. The serially connected thermocouple elements 11 and 12 are inserted in a refractory protective tube 14 which may be made of silica, quartz or "Vycor." The opposite ends of the refractory tube 14 are supported within a body structure comprising a refractory cement 15 which is positioned within a cup-shaped body member 16 which may be of the type disclosed and claimed in copending application Ser. No. 193,706, filed May 10, 1962 by Davies, now Pat. 3,298,874, issued Jan. 17, 1967. A fusible protective cap 17 encloses the refractory protected thermocouple and is mounted on the body member 16. The body member 16 is adapted to be inserted into one end of a tube 18 preferably made from cardboard or equivalent heat insulating material. The structure of the thermocouple assembly 10, as thus far described, is similar to that disclosed in the aforementioned Davies application. The thermocouple elements 11 and 12 will normally be made from noble metal materials and, thus, in order to use short lengths of these elements, their ends opposite the hot junction 13 are connected within the body 16 to short lengths of leadwire extensions 19 and 20 which extend from the opposite end of the body member 16 for connection in a measuring circuit.

Heretofore, in measuring the temperature of a molten bath in an open hearth or electric furnace, it has been customary to utilize a manipulator in the form of a metal pole having leadwires running from one end thereof to the other for connection with the leadwire extensions on the expendable thermocouple device. Such arrangements have been illustrated in the aforesaid patents and in the aforesaid Davies application. Such manipulators are normally about eight or ten feet long in order that they may extend through the opening in the wicket hole of an open hearth furnace and reach below the level of the surface of the molten bath within the furnace. When using such devices in a basic oxygen furnace, it is necessary to shut off the oxygen, remove the lance and tip the furnace to one side in order to reach the molten metal bath inasmuch as in basic oxygen furnaces, the distance to the bath with the furnace in upright position is in the order of thirty to forty feet.

In accordance with the present invention, a unit is constructed and arranged in a manner such that it may be dropped into a basic oxygen furnace while the furnace is in an upright position, hence, the leadwire extensions 19 and 20 are adapted to be connected by crimped connectors 21 and 22 to corresponding leadwires 23 and 24 which form part of a coil of heat insulated leadwire cable 25. The cable 25 is long and flexible so that it may be coiled in various shapes and includes an outer casing which is solidly packed with asbestos insulation or equivalent insulation including rubber compositions, and heavy paper wrapping sufficient to protect the leadwires 23 and 24 during the time required to obtain a temperature measurement reading. In order to keep the leadwires 23 and 24 from contacting each other within the cable 25, such leadwires are provided with electrical insulation sleeves 23a and 24a, respectively, which may be color coded or otherwise marked to identify polarity of the thermocouple. The leadwire cable 25 is adapted to be brought out through the rear of the cardboard tube 18 clamped thereto as by staples 27 and spirally wrapped around the cardboard tube 18. While the length of the cardboard tube is not critical, it has been found that a cardboard tube three feet long will allow approximately fifty feet of approximately ½" O.D. leadwire cable to be wrapped therearound.

In order to guide the thermocouple assembly 10 in the furnace so that it will drop with the thermocouple end "head first," a metal weight in the form of a sleeve 28 of steel or cast iron is press fitted onto the thermocouple end of the cardboard tube 18 as shown in FIG. 1. The metal sleeve 28 is provided with a tapered inside diameter which tapers from a diameter at the end 28a which is slightly larger than the outside diameter of the cardboard tube 18 to an inside diameter at the end 28b which is slightly smaller than the outside diameter of the coardboard tube 18 so that the sleeve 28 may be jammed over the outside diameter of the cardboard tube 18. It was found that with a cardboard tube of a three-foot length, the weight or sleeve 28 having a weight of approximately six to eight pounds, would provide the proper directional control for the expendable immersion thermocouple assembly. In a particular embodiment, the sleeve 28 had a length of about five inches, an outside diameter of about three inches and an inside diameter at the end 28a of about $1^{29}\!/_{32}$ inches and an inside diameter at end 28b of about $1^{27}\!/_{32}$ inches. The sleeve was made from cast iron and had an approximate weight of six pounds.

The coiling of the leadwire cable 25 has several advantages. First, in the modification shown in FIG. 1, by wrapping the cable around the cardboard tube 18, the cable is prevented from being twisted and tangled during the time of use as well as during shipping and handling. Secondly, there is produced a tension spring action of the leadwire cable as the weighted expendable thermocouple assembly falls into the bath which retards the fall sufficiently to prevent the refractory protected thermocouple from being smashed on impact with the molten steel bath. This spring action has eliminated any need for an additional protective covering over the fusible cap 17 so as to protect the thermocouple.

In the aforesaid patents on expendable thermocouples, it was pointed out that it is the practice to use as the thermocouple elements one element of platinum and the second element of an alloy of platinum plus ten percent rhodium. With a noble metal thermocouple of this type, one of the leadwires is made of copper while the other leadwire, which connects to the platinum thermocouple element, is made of an alloy of nickel and copper (98% copper and about 2% nickel) such alloy being known commercially in the trade as No. 11 alloy. By making the thermocouple from one thermocouple element which is platinum plus six percent rhodium and the other thermocouple element from platinum plus thirty percent rhodium, both of the extension leadwires may be made from copper, thus, eliminating the need for the compensating leadwire No. 11 alloy material. Since the leadwires 23 and 24 in the expendable thermocouple assembly 10 of this invention are an expendable part of the assembly, it is highly desirable, from a cost standpoint, to make these leadwires as inexpensive as possible and, therefore, the use of pure copper for the leadwire materials provides a distinct advantage. However, copper leadwires create a further problem, for while the couple material itself can be made of platinum plus six percent rhodium versus platinum plus thirty percent rhodium and, thus, eliminate the need for any compensating leadwire materials, in most cases, the steel mills are already using platinum versus platinum plus ten percent rhodium thermocouple recorders for the final temperature readings that are obtained with the earlier type expendable immersion thermocouples when the furnaces are turned down. In view of this, it is quite advantageous for the steel mill, if it is able, to use the same recorder for the drop-in or throw-in temperature measurements as used for measurements obtained using the prior art pole type immersion thermocouple for final temperature measurement when the furnace is turned down.

This may be accomplished by utilizing a compensating circuit as illustrated in FIG. 2, wherein the expendable portion of the "throw-in" couple 10 has been illustrated schematically with the outer ends of the leadwires 23 and 24 of the flexible cable 25 connected to the customer's cable designated as a floor terminal 30. The floor terminal 30 is connected by a pair of copper leadwires 31 and 32 to a special terminal 33 of a compensating circuit 40, indicated by a dotted rectangle, which is included in the case of the recorder 34, diagrammatically illustrated by the broken line rectangle in FIG. 2. The recorder 34 is preferably of the type disclosed in Williams Pat. No. 2,113,164, although other electronic types may be utilized as long as they have a sufficiently fast speed of response to record the temperature measurement. The recorder 34 also includes a standard thermocouple terminal board 35 to which are connected a copper leadwire 36 and a No. 11 alloy leadwire 37 which are joined at 38 to provide a reference junction. The negative terminals of the special terminal board 33 and the standard terminal board 35 are connected by a copper leadwire 39 while the positive terminals of these terminal boards are connected by the Wheatstone bridge network of the compensating circuit 40.

The compensating circuit has two functions, first, it supplies an additional bias to the output of the platinum plus six percent rhodium versus platinum plus thirty percent rhodium to raise it to the millivolt value of a platinum versus platinum plus ten percent rhodium thermocouple at the molten steel temperature. This may be accomplished because over a range of approximately plus or minus 150° F. around the 2800° F. point, the slope of the platinum plus six percent rhodium versus platinum plus thirty percent rhodium curve is approximately the same as the slope of the platinum versus platinum plus ten percent rhodium curve. The second function of the compensating circuit is to compensate for the slight output as produced by the platinum versus platinum plus ten percent rhodium termocouple extension leads at the ambient temperature of the terminal board 35. The compensating circuit 40 comprises a Wheatstone bridge comprising resistances $R_1$, $R_2$, $R_3$ and $R_c$ disposed in corresponding legs of the bridge network and with a battery E connected across conjugate points of the bridge network in series with a switch comprising contacts 109R and 110R. The compensating circuit 40 acts as an unbalanced Wheatstone bridge supplying an output voltage which consists both of the fixed bias required to bring the output level of the platinum plus six percent rhodium versus platinum plus thirty percent rhodium couple up to that of the platinum versus platinum plus ten percent rhodium couples as well as a variable voltage which varies directly with the EMF output of the compensating leads with variation in ambient temperature at the terminal board 35.

In one installation, the various elements of the compensating circuit had the following typical values:

$E = 1.35$ volts (42R mercury cell)

$R_1$, $R_2 = 8660$ ohms (standard value resistor to plus or minus one percent tolerance)

$R_3 = 43.931$ ohms (manganin, plus or minus .01 percent tolerance)

$R_c = 10.390$ ohms at 35° C. (calibrated for change of resistance with temperature)

As previously mentioned, the recorder 34 preferably is of the type disclosed in Williams Pat. No. 2,113,164. For purposes of clarity, the parts of the recorder 34 in FIG. 2 have been provided with the same reference characters with the addition of the letter R as corresponding parts in FIG. 2 of the aforesaid Williams patent. It will be seen that the switch contacts 109R and 110R of the compensating circuit are physically located in the recorder 34 to connect the battery E of the compensating circuit into the measuring circuit. The movable contact 109R is adapted to be actuated by a cam 108R mounted on a shaft 85R and the cam 108R is shaped so that it closes the contacts 109R and 110R only after the recorder indicator or pen 46R, which is adapted to be driven by the endless belt 44R which passes around the drum 43R, has moved above the 200° F. point on the recorder. This is required because the bias voltage from the compensating circuit would, if connected initially, cause the premature actuation of the chart motor drive.

Referring to FIG. 3, there is shown a modification of the invention and similar parts to the embodiment shown in FIG. 1 have been provided with corresponding reference characters. In the expendable immersion thermocouple assembly 50 of FIG. 3, the body member 15A, which may comprise a ceramic plug or block of high temperature cement, is positioned directly in the lower end of the cardboard tube 18A. The ends of the U-shaped tube 14A through which serially extend the thermocouple elements 11A, 12A which are joined therein to form the measuring junction 13A, are contained within the ceramic body 15A and supported thereby. The ends of the thermocouple elements 11A and 12A, remote from the measuring junction 13A, are adapted to be connected to the leadwires 23A and 24A, respectively, of the high temperature insulated leadwire cable 25A. It is to be understood that short leadwire sections or extensions similar to extensions 19 and 20 in FIG. 1, as well as crimped connectors 21 and 22, may be utilized in the modification shown in FIG. 3 for making connections to the leadwires 23A and 24A of the cable 25A exteriorly or interiorly of the cement body 15A, if desired. It is also to be understood that the cement body 15A may be supported in the lower end of the cardboard tube 18A in any of the various ways disclosed in the aforesaid Mead Pat. No. 3,038,951. The fusible metal cap 17A is adapted to protect the U-shaped tube 14A.

In the modification shown in FIG. 3, it will be noted that the heat insulated cable 25A is coiled within the cardboard tube 18A with the sides thereof engaging the inner wall of the cardboard tube 18A. The cable 25A may be coiled in the form of a helix or it may be folded back and forth in an accordian type fold. The coiled cable 25A functions in a similar manner to the coiled cable 25 illustrated in FIG. 1. The upper end of the cable 25A is provided with a suitable electrical connector 51. The connector 51 comprises a cardboard tube over which extend the bare ends of wires 23A and 24A which are adapted to mate with a cooperating electrical connector 52 having contact rings 53 and 54 connected to a pair of leadwires adapted to be connected at their opposite ends to the terminal 33 of recorder 34 as shown in FIG. 2. The connector 52 is similar to the construction shown in FIG. 8 of the aforesaid Parker Pat. No. 3,048,642. The connector 52 is mounted on the end of a housing 55.

The housing 55 is adapted to contain means for propelling or projecting the thermocouple assembly 50 into the molten bath for a temperature measurement. The projecting means illustrated in FIG. 3 comprises a helical spring 58 which is coiled within the housing 55 with one end of the spring 58 being secured to an end of the housing 55 as by an ear portion 58a which extends through an opening in the housing 55. The opposite end of the coiled spring 58 is fixed to a washer member 59 which has an O.D. smaller than the I.D. of the housing 55 and an I.D. larger than the O.D. of the connector 51.

In operation, the connector 51 is adapted to be mated with connector 52 and the upper end of the cardboard tube 18A of the expendable immersion thermocouple assembly 50 is adapted to be loaded into the open end of the housing 55 against the force of the coiled spring 58, or equivalent propelling means, until an opening in the side wall of the tube 18A is in alignment with a release pin 60 which extends through the wall of the housing 55. The release pin 60 is adapted to hold the spring 58 under compression with the washer 59 in engagement with the upper end of the tube 18A as shown in FIG. 3 preparatory to projecting the expendable immersion thermocouple assembly 50 into the bath of the furnace. When the pin 60 is withdrawn from the opening in the cardboard tube 18A, the coiled spring 58 is released from its compressed state thereby releasing the stored energy of the spring to propel the expendable immersion thermocouple assembly 50 into the bath.

To overcome the buoyant force of the bath due to the density of the metal, an additional weight in the form of an iron pipe 28A is provided at the lower end of the cardboard tube 18A. The pipe or sleeve 28A may be press fitted onto the tube 18A in a manner as previously described in connection with FIG. 1. In order to keep the U-shaped tube 14A and the thermocouple contained therein off the bottom of the furnace, one or more ceramic insulator rod 63 may be attached to the lower end of the cardboard tube 18A. In FIG. 3, the rod 63 has been inserted in a slot cut in the lower end of the tube 18A and is held in place by means of cement and an additional cardboard sleeve 64 which is adapted to telescope over the lower end of the cardboard sleeve 18A.

While the propelling means has been illustrated in the modification of FIG. 3 in the form of a coiled spring, it is to be understood that other suitable propelling means may be utilized to project the expendable thermocouple assembly 50 into the bath such, for example, as a gun adapted to shoot the assembly 50 into the bath or the assembly 50 itself may contain a propellant material adapted to project the unit 50 into the bath by a rocket-like action. By utilizing a propellant such, for example, as an explosive material or powder, the projecting force may be accurately controlled as by the spring to control the force with which the expendable assembly 50 enters the molten bath. Such control is desirable in order to prevent damage to the thermocouple upon engagement with the surface of the molten bath and as pointed out above in connection with the embodiment in FIG. 1, the uncoiling of the heavy heat insulated cable 25A aids in this operation by providing a braking action on the expendable thermocouple assembly 50 as it is being projected through space towards the surface of the bath.

Referring to FIGS. 4 and 5, there is shown another modification of the invention. In the expendable immersion thermocouple assembly 70 of FIG. 4, the body structure 71 of the expendable thermocouple cartridge is mounted directly in the weight member 72. The body member 71 is similar to that disclosed in the aforesaid Parker Pat. No. 3,048,642 and may be made from ceramic or wood or other material having similar insulating characteristics. The thermocouple elements 11B and 12B, the hot junction 13B and the refractory U-tube 14B are similar to those illustrated in FIG. 1 and, thus, have been provided with corresponding reference characters. Similarly, the leadwire extensions 19B and 20B, the crimped connectors 21B and 22B and the leadwires 23B and 24B of the cable coil 25B are similar to the parts shown in FIG. 1 and, thus, have been provided with corresponding reference characters. The fusible cap 17B is of somewhat different shape than the one shown in FIG. 1; however, it functions in the same manner.

In FIG. 4, a high temperature cement 73 is utilized to seal the refractory tube 14B within the body member 71. The upper end 72a of the weight member 72 is provided with a threaded opening 72b which is adapted to receive a threaded connector 74 which also includes a claim 74a for attachment to the flexible cable 25B. After the threaded connector 74 is inserted into the weight member 72, the opening around the lower end of the cable 25B is packed with high temperature cement 75 to prevent the molten metal from reaching the leadwires 23B and 24B and their crimped connectors 21B and 22B within the weight member 72. The ceramic body 71 provides a seal with respect to the lower end of the weight member 72 and, thus, prevents the molten metal from entering 72 the weight member 72 from its lower end 72c. After the cement 75 has been packed around the connector 74, the clamp portion 74a thereof is tightened on the cable 25B. The weight member 72 is shaped so that the center of mass of the expendable immersion thermocouple assembly 70 is nearer the lower end 72c, thus insuring that the thermocouple assembly 70 will enter the molten bath with the temperature sensing portion downward. The cable 25B is provided with a support 18B to retain it in the form of a coil. The support 18B may comprise one or more paper tapes or it may comprise a cardboard tube around which the cable 25B is coiled similar to tube 18 in FIG. 1; however, in this modification of FIG. 4, the support tube for the coil 25B is not thrown into the furnace during a temperature measurement.

As may be seen in FIGS. 4 and 5, the lower end of the weight member 72 is provided with a plurality of openings which are adapted to receive the ends of a corresponding number of rods 76. The rods 76 are adapted to be positioned at equidistant locations around the axis of the weight member 72 as shown in FIG. 5. The rods 76 have a length greater than the projecting length of the thermocouple U-tube 14B and cap 17B beyond the end 72c of weight member 72. Thus, it will be seen that the rods 76 are adapted to function in the same manner as the rod 63 in FIG. 3. The rods in FIGS. 3–5 may also be used in the embodiment of FIG. 1. While the embodiments of the expendable immersion thermocouple assemblies illustrated in FIGS. 1–5 are particularly suited for use in measuring the temperature of a molten bath of steel in a basic oxygen furnace, it is to be understood that they are not limited to such use but may be used in measuring the temperature of molten baths in other types of furnaces.

Referring to FIGS. 6–9, there is illustrated a further modification of the invention. The expendable immersion thermocouple assembly 80 of FIG. 6 is similar to the previous modifications in that it contains as an integral element thereof a coil or supply of heat insulated leadwire cable 25C having the total length required to extend from a point outside the furnace to the molten metal bath within the furnace. The cardboard tube 18C is of relatively short length in the order of three to four feet and contains the supply of leadwire cable 25C, the latter being coiled therein in the form of a helix, accordian fold or other suitable fold as previously described. The immersion end of the cardboard tube 18C supports a heat resistant body 15C which in turn supports a thermocouple contained within a refractory sheath 14C. The thermocouple comprises a pair of thermocouple elements 11C and 12C joined together at 13C to form the hot or measuring junction. The heat resistant body 15C may be formed in any of the ways previously described in connection with the other modifications illustrated herein and the leadwires 23C and 24C of cable 25C may be connected to the thermocouple elements 11C and 12C in any of the ways previously described herein. The leadwire 23C in adapted to be connected to a short sleeve 81 while the leadwire 24C is adapted to be connected to a similar short sleeve 82. The sleeves or rings 81 and 82 are preferably constructed from cardboard or similar material cemented together to form a unit and constitute an electrical connector which is cemented to, but separable from the cardboard tube 18C. The ends of the leadwires 23C and 24C extend respectively over the outer circumferance of the rings 81 and 82 and form contacts 23C', 24C' which respectively engage the circular contact rings 83 and 84 which extend around the inner circumference of the tubular contact block 85. The contact block 85 is supported at the rear end of a pipe 86 within which the expendable immersion thermocouple assembly 80 is adapted to be positioned. The pipe 86 has a length such that the total length of the pipe 86 plus the length of the cardboard tube 18C equals the required length needed to reach the bath. In an open hearth furnace, such length is in the order of eight to ten feet, that being somewhat in excess of the distance from the wicket hole to the bath.

As may be seen in FIGS. 6 and 7, the contact block 85 supports a terminal board 87 which in turn has a pair of screw terminals 89 and 90 to which the contacts 83 and 84 are respectively connected. The terminals 89 and 90 are adapted to be connected by means of leadwires such as leadwires 31 and 32 in FIG. 2, to the terminal 33 of a recorder 34 as previously described. After the expendable immersion thermocouple assembly 80 has been loaded into the pipe 86 with the contacts 23C' and 24C' in engagement with the contacts 83 and 84, respectively, of contact block 85, the cardboard tube 18C is ready to be pushed down the slotted pipe 86 so that it will extend from the opposite end of the pipe 86 in the manner of a telescope. This may be accomplished by means of a handle 92, pivoted at 93, which is provided with a pointed end 92a adapted to partially penetrate the wall of the cardboard tube 18C. The handle 92 is provided with the cross pin 93 which extends into a pair of opposed grooves 94a which are positioned in the opposed faces of guide rails 94 secured to the pipe 86 adjacent the slot 86a therein. It will be noted that the outside diameter of the carboard tube 18C telescopes within the inside diameter of the pipe 86 and that the contact blocks 81 and 82 have an outside diameter greater than the inside diameter of the pipe 86. Thus, when the handle 92 is moved so that the point 92a digs into the cardboard tube 18C and then downwardly, as shown in FIG. 6, the cardboard tube 18C will move through the pipe 86 and project from one end thereof while the contact blocks 81 and 82 will remain stationary with respect to the contact block 85. As the handle 92 continues to move down as shown in FIG. 6, the supply of leadwire cable 25C will be uncoiled until the handle 92 reaches the end of the groove 94a in the tracks 94 at which time the handle 92 locks the cardboard tube 18C in place at the lower end of the pipe holder section 86 by means of a detent notch or the like, not shown.

The thermocouple end or immersion end of the expendable immersion thermocouple assembly 80 is then inserted into the furnace and the thermocouple immersed below the surface of the bath. Since the combined length of the cardboard tube 18C and the pipe 86, when extended in the foregoing manner, is greater than the distance from the wicket hole to the bath, it will be seen that the connector assembly including the contact sleeves 81 and 82 and contact block 85 remain out of the furnace during measurement and, thus, the connections to the leads from the recorder are exterior of the furnace the same as described in the previous modifications. A complete new expendable immersion thermocouple assembly 80, including cable 25C and contact sleeves 81 and 82, is used for each measurement and, thus, it will be seen that fresh leadwire is used for each reading as part of the expendable assembly 80. While a portion of the pipe holder section 86 is placed within the furnace, it is not immersed in the steel bath itself and since it has no electrical connections on the part within the furnace, repeated use and exposure thereof to the furnace atmosphere will not harm it.

Additional modifications of the separable contact connectors for the modification shown in FIG. 6 are illustrated in FIGS. 8 and 9. In FIG. 8, the cardboard tube 82A extends around the outside diameter of the cardboard tube 18C. The cardboard tube 81A has a wall thickness equal to the combined wall thicknesses of tubes 82A and 18C. The electrical contact portions 23C' and 24C' of the leadwires 23C and 24C are attached to the outer circumferences of the cardboard tubes 81A and 82A. In FIG. 9, the leadwires 23C and 24C of the cable 25C extend along the sides of the plug member 96 which extends into the end of the cardboard tube 18C. The plug member 96 may be made from wood, plastic, cardboard or other suitable insulating material and serves as a contact block for supporting the contact portions 23C' and 24C' of the leadwires 23C and 24C of cable 25C. The block 96 is provided with slots 96a and 96b at the opposite ends thereof through which the corresponding leadwires 23C and 24C extend thereby separating the leadwire contact portions 23C' and 24C' longitudinally of the block 96 for engagement with the corresponding electrical contact rings 83 and 84 of the pipe holder assembly in FIG. 6.

Since the leadwire cable 25C, in the modification shown in FIGS. 6–9, is contained within the cardboard tube 18C and the pipe 86 during immersion of the termocouple and does not come in contact with the bath, it will be understood that the heat insulation on the cable 25C, in this modification, may be less heat resistant than on the leadwire cables in the embodiments shown in FIGS. 1, 3 and 4 where such leadwire cables are adapted to come into direct contact with the molten bath. In all of the modifications disclosed herein, it will be seen that the expendable thermocouple assemblies include, as an expendable portion thereof, the coils of leadwire cable which extend from a point outside the furnace to the thermocouple in the assemblies and, thus, all of the electrical circuit which is placed in the furnace during a temperature measurement is expendable and replaced for each succeeding measurement. It is for this reason that it is desirable to use thermocouple elements of alloys which do not require the use of compensating leadwires but instead which permit the use of ordinary copper leadwires for both leadwire connections as previously described.

The term "coil" as used in the claims is defined generically as including a spiral, helix, hank, accordian fold, wad or any other predetermined arrangement of the supply of heat insulated leadwire cable.

It is to be understood that the present invention is not limited to the specific arrangements described and illustrated herein but further modifications thereof may be made within the scope of the appended claims.

What is claimed is:

1. An expendable immersion temperature-sensing assembly for measuring the temperature of a molten bath in a container comprising:
   body structure including material having both heat insulating and electrical insulating characteristics,
   a refractory protected heat-responsive device supported by said material and projecting from one end of said body structure,
   a protective member disposed about said refractory protected heat-responsive device,
   tubular support means connected to said body structure, and
   a coil of heat insulated leadwires supported within said tubular support means with the turns of said coil being in engagement with the inner wall of said tubular support, said leadwires being electrically connected at one end to said heat-responsive device, said leadwires having a length several feet greater than the length of said tubular support means for extension therebeyond an adequate distance to permit said device to penetrate to a subsurface level of the molten bath while the opposite end of said leadwires is adapted for connection to the leads of a measuring system at a point exterior of said container, said coil of insulated leadwires being withdrawn from said tubular support means during insertion of said device into the molten bath, the uncoiling of said leadwires providing a braking action on said temperature-sensing assembly as it passes through space toward the surface of the molten bath and said heat insulation on said leadwires being adequate to protect said leadwires upon direct exposure to conditions within the container for a period of time adequate to complete a temperature measurement of the bath.

2. An expendable immersion temperature-sensing assembly according to claim 1 including means for moving said heat-responsive device to a position below the surface of the molten bath.

3. An expendable immersion temperature-sensing assembly according to claim 2 wherein said means for moving said heat-responsive device below the surface of the molten bath comprises an elongated holder structure.

4. An expendable immersion temperature-sensing assembly according to claim 2 wherein said means for moving said heat-responsive device below the surface of the molten bath comprises weight structure of material of density greater than the molten bath.

5. An expendable immersion temperature-sensing assembly according to claim 4 wherein said weight structure is affixed to and extends around said tubular support means adjacent said body structure, the part of said tubular support means extending from said weight structure to the coil accommodating end of said tubular support means being of a sufficient length to guide the assembly weight end foremost during insertion of said device into the molten bath.

6. An expendable immersion temperature-sensing assembly according to claim 2 wherein said means for moving said heat-responsive device below the surface of the molten bath comprises propelling means adapted to produce a force against said body structure.

7. An expendable immersion thermocouple assembly for measuring the temperature of a molten bath in a furnace comprising:
   body structure including material having both heat insulating and electrical insulating characteristics,
   a refractory protected thermocouple device mounted in said material and projecting from one end of said body structure,
   a fusible protective cap enclosing said refractory protected thermocouple device,
   a cardboard tube having said body structure mounted in one end thereof, and
   a coil of heat insulated leadwires electrically connected at one end to said thermocouple device, said coil being supported within said cardboard tube with the turns of said coil being in engagement with the inner wall of said cardboard tube, said leadwires having an uncoiled length several feet greater than the length of said cardboard tube for extension therebeyond an adequate distance to permit said thermocouple device to penetrate to a subsurface level of the molten bath while the opposite end of said leadwires is adapted for connection to a measuring system, said leadwires being uncoiled during insertion of said thermocouple device into the molten bath, the uncoiling of said leadwires providing a braking action on said thermocouple assembly as it passes through space toward the surface of the molten bath and said heat insulation on said leadwires being adequate to protect said leadwires upon direct contact with the molten bath for a period of time adequate to complete a temperature measurement of the bath.

8. An expendable immersion thermocouple assembly according to claim 7 including a weight affixed to and extending around the tube adjacent the end of the tube carrying the thermocouple device, the part of the tube extending between the weight and the leadwire accommodating end of the tube being of sufficient length to guide the assembly weight end foremost in its plunger in the bath.

9. An expendable immersion temperature-sensing assembly according to claim 1 and a holder for said assembly comprising:
   a pipe for receiving said assembly,
   an electrical connector located at the rear end of said pipe for engagement with electrical contacts of said leadwires, and
   mechanical means carried by said pipe for moving said cardboard tube outwardly of the front end of said pipe to immerse said thermocouple device in said bath.

10. An expendable immersion temperature-sensing assembly for measuring the temperature of a molten bath in a container comprising:
   body structure including material having both heat insulation and electrical insulating characteristics,
   a refractory protected heat-responsive device supported by said material and projecting from one end of said body structure,
   a protective member disposed about said refractory protected heat-responsive device,
   tubular support means of heat-insulating material connected to said body structure,
   a coil of heat insulated leadwires, said leadwires being electrically connected at one end to said heat-responsive device within said tubular support means adjacent the end where said tubular support means is connected to said body structure, said leadwires having a length several feet greater than the length of said tubular support means for extension beyond the other end of said tubular support means an adequate distance to permit said device to penetrate to a subsurface level of the molten bath while the opposite end of said leadwires is adapted for connection to the leads of a measuring system at a point exterior of said container, said coil of insulated leadwires being uncoiled during insertion of said device into the molten bath, the uncoiling of said leadwires providing a braking action on said temperature sensing assembly as it passes through space toward the surface of the molten bath, said heat insulation on said leadwires being adequate to protect said leadwires upon direct exposure to conditions within the container for a period of time adequate to complete a temperature measurement of the bath, and
   means comprising a weight for moving said heat-responsive device to a position below the surface of the molten bath, said weight being affixed to said tubular support means adjacent said body structure, the part of said tubular support means extending from said weight to the other end of said tubular support means being of a sufficient length to guide the assembly weight end foremost during insertion of said device into the molten bath.

11. An expendable immersion temperature sensing assembly according to claim 10 wherein said coil of heat insulated leadwires is supported by support means in spaced relation to said weight.

12. An expendable immersion temperature sensing assembly according to claim 11 wherein said support means in spaced relation is a tubular support means.

References Cited

UNITED STATES PATENTS

| 3,221,556 | 12/1965 | Campbell et al. | 136—200 UX |
| 3,298,874 | 1/1967 | Davies | 136—232 |
| 3,374,122 | 3/1968 | Cole | 136—234 |

FOREIGN PATENTS

| 681,508 | 3/1964 | Canada | 136—234 |

ALLEN B. CURTIS, Primary Examiner